United States Patent
Cardona et al.

(10) Patent No.: US 9,350,825 B2
(45) Date of Patent: May 24, 2016

(54) OPTIMIZING NETWORK COMMUNICATIONS

(71) Applicant: International Business Machines Corporation, Armonk, NY (US)

(72) Inventors: Omar Cardona, Cedar Park, TX (US); Matt R. Hogstrom, Cary, NC (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/305,951

(22) Filed: Jun. 16, 2014

(65) Prior Publication Data

US 2015/0365493 A1 Dec. 17, 2015

(51) Int. Cl.
  *G06F 15/173* (2006.01)
  *H04L 29/08* (2006.01)
  *H04L 12/26* (2006.01)

(52) U.S. Cl.
  CPC .......... *H04L 67/32* (2013.01); *H04L 43/0811* (2013.01); *H04L 67/2833* (2013.01); *H04L 67/306* (2013.01); *H04L 67/325* (2013.01)

(58) Field of Classification Search
  USPC ......... 709/203, 217, 219, 223, 224, 226, 228, 709/238
  IPC .............. H04L 43/0811,67/32, 67/306, 67/325, H04L 67/2833
  See application file for complete search history.

(56) References Cited

U.S. PATENT DOCUMENTS

| 6,829,662 | B2 |  | 12/2004 | King-Smith et al. |
| 7,222,152 | B1 | * | 5/2007 | Thompson .............. H04L 67/00 709/224 |
| 7,493,427 | B2 | * | 2/2009 | Freimuth ............ G06F 12/0862 709/213 |
| 7,533,176 | B2 | * | 5/2009 | Freimuth ................ H04L 49/90 709/225 |
| 7,962,628 | B2 | * | 6/2011 | Freimuth ................ H04L 49/90 709/226 |
| 8,996,612 | B1 | * | 3/2015 | Klager .................... G06F 9/545 709/203 |
| 2008/0056249 | A1 |  | 3/2008 | Ocko et al. |
| 2010/0017535 | A1 |  | 1/2010 | Aloni et al. |

OTHER PUBLICATIONS

List of IBM Patents or Patent Applications Treated as Related, Aug. 27, 2014, 1 page.
Menon, Aravind et al., "Optimizing TCP Receive Performance", http://static.usenix.org/event/usenix08/tech/full_papers/menon/menon_html/, retrieved on Jun. 12, 2012, 24 pages.

(Continued)

*Primary Examiner* — Quang N Nguyen
(74) *Attorney, Agent, or Firm* — Francis Lammes; Stephen J. Walder, Jr.; Grant Johnson

(57) ABSTRACT

A mechanism is provided for optimizing network communications. A first data transfer request is received via a first application level socket connection in an originating computing device. Prior to opening a kernel level socket connection to a destination computing device, a determination is made as to whether a second data transfer request has been received via a second application level socket connection in the originating computing device, the second data transfer request identifying a destination computing device that is the same as the destination computing device as the first data transfer request. Responsive to identifying the second data transfer request, the first data transfer request and the second data transfer request are coalesced into a third data transfer request stored in a single kernel level socket buffer of the originating computing device. The third data transfer request is then sent to the destination computing device via a single TCP/IP stack.

12 Claims, 5 Drawing Sheets

(56) References Cited

OTHER PUBLICATIONS

Shieh, Alan et al., "A Stateless Approach to Connection-Oriented Protocols", ACM Transactions on Computer Systems, vol. 26, No. 3, Article 8, http://www.cs.cornell.edu/people/egs/papers/trickles-tocs.pdf, Sep. 2008, 50 pages.

White, Bill et al., "IBM zEnterprise System Technical Introduction", IBM Corporation, http://www-ti.informatik.uni-tuebingen.de/~spruth/edumirror/xx095.pdf, Jul. 28, 2010, 164 pages.

* cited by examiner

OPTIMIZING NETWORK COMMUNICATIONS

BACKGROUND

The present application relates generally to an improved data processing apparatus and method and more specifically to mechanisms for optimizing network communications.

Analytics provides for the extraction and consolidation of large volumes of high quality data in data warehouses and organizing data in a way that can be analyzed efficiently. This enabled the use of data for integrated performance management and resource planning across an enterprise. Analytics applying statistical and data mining techniques draws deeper insights to predict behavior and events. Thus, analytics is no longer just predictive but also prescriptive, often applying optimization methods to answer what are the best outcomes, which is referred to as smart analytics.

Smart analytics simplifies data to be consumable and accessible to everyone, optimized for their specific purpose, at the point of impact, to deliver better decisions and actions. Smart analytics is about descriptive, predictive, and prescriptive analytics. Smart analytics, and the insights derived from smarter analytics, let various industries and businesses spot new opportunities and uncover hidden connections. Smart analytics applications typically exchange a great number of concurrent messages with their application servers to complete a given transaction. These messages can range from very small (i.e. 64 B) to larger sizes (i.e. >64K), but have particular request/response characteristics for a specific transaction. The varying size of the messages create a mismatch with standard communication protocols when optimal network communications are desired.

SUMMARY

In one illustrative embodiment, a method, in a data processing system, is provided for optimizing network communications. The illustrative embodiment receives a first data transfer request via a first application level socket connection in the originating computing device. Prior to opening a kernel level socket connection to a destination computing device identified in the first data transfer request, the illustrative embodiment determines whether a second data transfer request has been received via a second application level socket connection in the originating computing device. In the illustrative embodiment, the second data transfer request identifies a destination computing device that is the same as the destination computing device as the first data transfer request. The illustrative embodiment coalesces the first data transfer request and the second data transfer request into a third data transfer request stored in a single kernel level socket buffer of the originating computing device in response to identifying the second data transfer request. The illustrative embodiment sends the third data transfer request stored in the single kernel level socket buffer of the originating computing device to the destination computing device via a single Transmission Control Protocol/Internet Protocol (TCP/IP) stack in the originating computing device to the destination computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
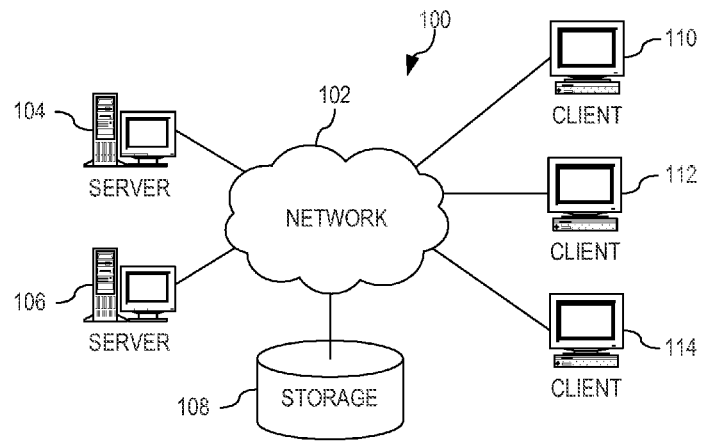
FIG. 1 is an example diagram of a distributed data processing system in which aspects of the illustrative embodiments may be implemented.

Again, smart analytics utilize smart analytics applications that exchange a plurality of concurrent application messages with application servers, such as database servers, to complete a transaction. These smart analytics applications require a very high rate of message exchanges between analytics computer systems over the network. Application messages may range from very small (i.e. 64 bytes) to larger sizes (i.e. greater than 64 kB) but have request/response characteristics for a specific transaction. However, a vast majority of these messages are small. Smart analytics messages originate from and are consumed by multiple processes that have their own connections. Therefore, current underlying communication systems cannot aggregate the vast majority of small messages into larger messages. The illustrative embodiments address this deficiency.

A smart analytics system typically has multiple concurrent transactions in progress to the same destination application server. Concurrency from the application is achieved via the use of multiple sockets. When reliable delivery via Transmission Control Protocol/Internet Protocol (TCP/IP) is used, system/performance overhead is incurred. Each individual socket is managed as a separate connection from the application. However, from the kernel point of view, the smart analytics system is unaware of the sockets grouping/teaming use by the smart analytics application.

The streaming nature of TCP necessarily means that, if each socket is sending small amounts of data, the data buffer will not fill up fast enough to allow for message coalescing per socket. This results in the case where a small amount of data is pulled off the socket for TCP processing and sent to the destination. Small message transfers by nature have a higher central processing unit (CPU) cost per byte transmitted due to the traversals down and back up the protocol stack.

Larger messages, those that allow for coalescing of the streaming data into the socket buffer at a sufficiently large size to exceed the network maximum transmission unit (MTU), result in lower CPU cost per byte. The operating system (OS) stack is able to leverage stateless offloads such as Large Send Offload (LSO) by having the adapter application-specific integrated circuit (ASIC) perform segmentation of the packet into MTU or maximum segment size (MSS) frames to the destination. On the destination, the adapter is able to perform a coalescing of said frames on the network into a Large Receive Offload (LRO).

Known solutions to this problem require application modification in the way sockets are used from kernel space. Thus, the application has to perform the coalescing per socket at the expense of concurrency. Therefore, the limitation is now twofold, such that the application requires changing, which is undesirable, and concurrent socket operations are eliminated.

Therefore, the illustrative embodiments provide an Application Communication Protocol Module (ACPM) that optimizes network communications for analytics applications to deliver maximize throughput and system resource efficiency of smart analytics systems. The ACPM coalesces and/or aggregates messages across associated application sockets at the Open Systems Interconnection (OSI) Session Layer (i.e. Layer 5) inside of the kernel so that application server workloads may benefit from circumventing high CPU costs of small concurrent message transactions to a common destination.

As with the traditional model, in the illustrative embodiments, an application establishes one or more socket connections where both the user space and the kernel space are aware of the connection. Afterwards, in the OS kernel space, the ACPM discovers which specific application sockets are associated with a common source or destination. The ACPM then groups those sockets that are associated with a common source or destination with a single kernel level socket, creating an aggregation group of sockets on top of a kernel socket. Since concurrent socket operations from the application will provide an aggregation of messages to a single kernel space socket buffer, the ACPM sends a single large message to the lower level stack (i.e. Layer 4, Layer 3, Layer 2), which may benefit from stateless offloads, such as LSO. Thus, the ACPM of the illustrative embodiment result in a reduced CPU costs per byte via aggregated small messages into a larger payload message, concurrency from application space to kernel space via context switches and copy into kernel, and no recompile or change to the application program interface (API).

Given that an encapsulation of a message grouping to a common destination has been performed, the destination system must be ACPM aware. On the destination side the ingress frame is subject to standard packet coalescing via LRO. Once the large packet is provided up to the ingress TCP stack, an ACPM mechanism in the destination system unpacks and routes each message to the appropriate ingress socket of the destination application.

A "module," as used herein, may be an implementation of the functions or aspects of the illustrative embodiments in the form of an apparatus, a procedure, or a computer program product. The modules described herein may be implemented as specialized hardware, software executing on general purpose hardware, software instructions stored on a medium such that the instructions are readily executable by specialized or general purpose hardware, a procedure, or method for executing the functions, or a combination of the above.

Figure 2:
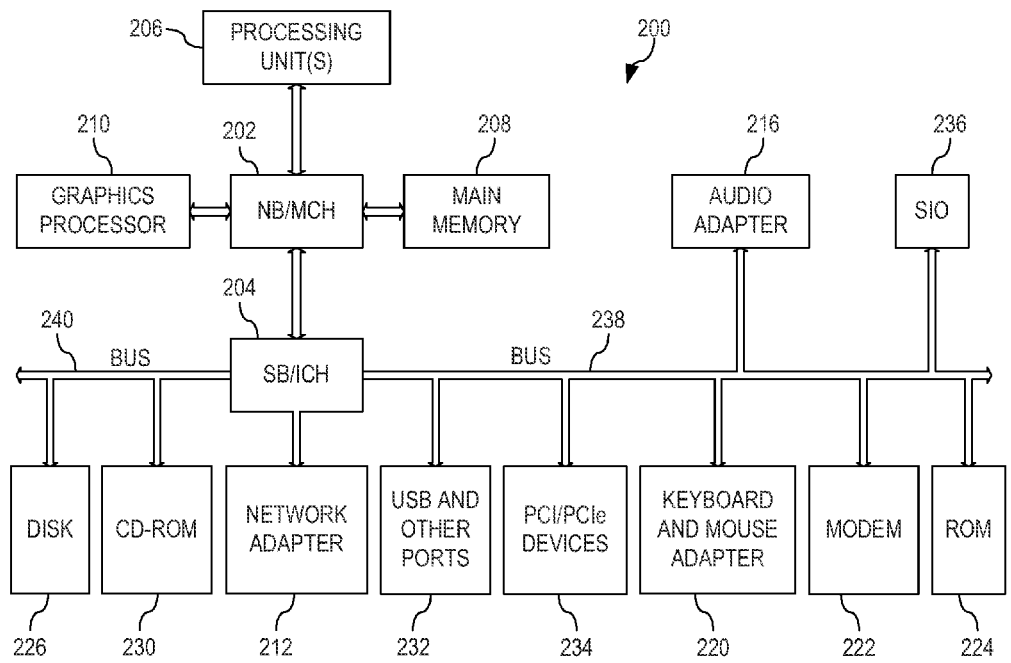
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
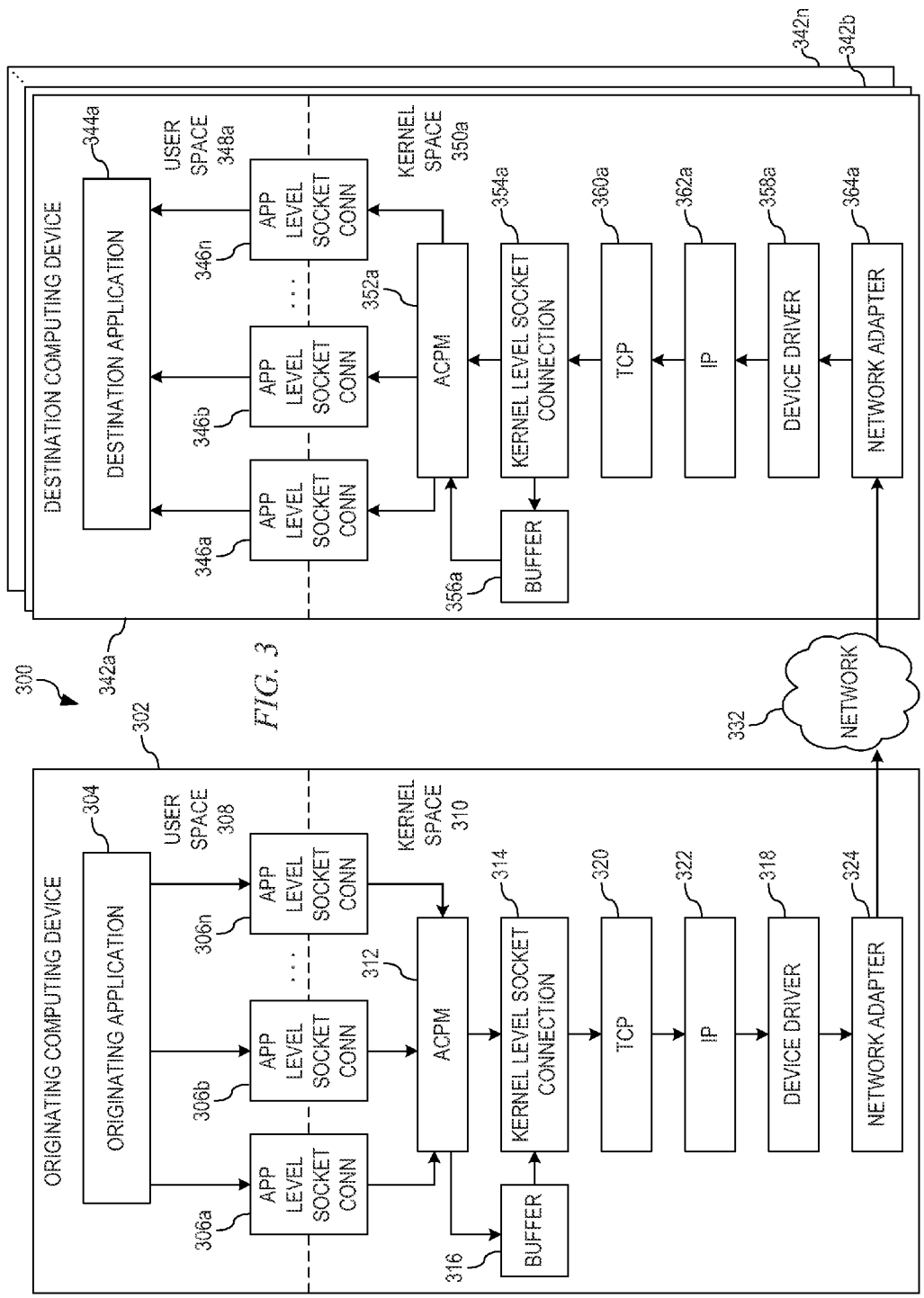
FIG. 3 depicts a functional block diagram of the utilization of an Application Communication Protocol Module (ACPM) within a data processing system in accordance with an illustrative embodiment.

Again, the illustrative embodiments provide an Application Communication Protocol Module (ACPM) that optimizes network communications for analytics applications to deliver maximize throughput and system resource efficiency of smart analytics systems. FIG. 3 depicts a functional block diagram of the utilization of the APCM within a data processing system in accordance with an illustrative embodiment. Data processing system 300 comprises originating computing device 302 and one or more destination computing devices 342a, 342b, . . . , 342n that are coupled to each other via network 332. Originating computing device 302 comprises originating application 304 which establishes one or more application level socket connections 306a, 306b, . . . , 306n in user space 308 when sending communications to destination computing devices 342a, 342b, . . . , 342n. In accordance with the illustrative embodiments, in kernel space 310, ACPM 312 receives a first data transfer request via first application level socket connection 306a, which is being sent, for example, to destination computing device 342a. Prior to opening a kernel level socket connection 314, ACPM 312 determines whether a second data transfer request has been received via a second application level socket connection 306b, . . . , or 306n, which is also being sent, for example, to destination computing device 342a.

Responsive to ACPM 312 identifying that both the first data transfer request and the second data transfer request are being sent to the same destination computing device 342a, ACPM 312 determines a size of each of the first data transfer request and the second data transfer request. Once the size of each of the first data transfer request and the second data transfer request is determined, ACPM 312 determines whether an aggregation of the first data transfer request and the second data transfer request exceeds underlying communications systems limits. If ACPM 312 determines that the aggregation of the first data transfer request and the second data transfer request exceeds the underlying communications systems limits, ACPM 312 sends the first data transfer request and the second data transfer request individually to the same destination computing device 342a.

If ACPM 312 determines that the aggregation of the first data transfer request and the second data transfer request would not exceed the underlying communications systems limits, ACPM 312 coalesces the first data transfer request and the second data transfer request into a third data transfer request. It is noted that while a first data transfer request and a second data transfer request are coalesced in this example, any number of data transfer requests destined for the same computing device 342a may be coalesced or aggregated as long as the message size limit of the underlying communications systems are not exceeded. ACPM 312 performs the coalescing or aggregation such that the first data transfer request and the second data transfer request are aggregated in the order in which they originate so that each data transfer request is processed in the order in which they originated at destination computing device 342a. By processing the data transfer requests in this manner, ACPM 312 optimizes aggregation wait time thereby achieving aggregation effectiveness versus the reduced latency of not sending the data transfer requests individually. Thus, if the underlying communications systems limits are not exceeded, ACPM 312 coalesces the first data transfer request and the second data transfer request into the third data transfer request without any modification to originating application 304. ACPM 312 further generates an aggregated message header for the third data transfer request that allows a destination ACPM, ACPM 352a in this example, to extract the first data transfer request and the second data transfer request in the order in which they originated and are coalesced.

ACPM 312 stores the third data transfer request in kernel level socket buffer 316 associated with opened kernel level socket connection 314. Kernel level socket connection 314 then sends the third data transfer request stored in kernel level socket buffer 316 to device driver 318 via a single TCP 320/IP 322 stack. Device driver 318 then sends the third data transfer request to device driver 358a in destination computing device 342a via adaptor 324, network 332, and adaptor 364a. Device driver 318 may send the third data transfer request to destination computing device 342a via network 332 utilizing a stateless offload for a network adapter, the stateless offload being, for example, a large send offload (LSO). That is, LSO is network communications acceleration hardware built into, for example, a Network Interface Card (NIC). The LSO hardware segments the large message into multiple network packets complying to frame sizes supported by Open Systems Interconnection (OSI) Session Layer 2 network. In addition, the LSO hardware inserts a protocol header, such as TCP or IP, and computes and inserts a checksum, thereby saving computer systems resources.

Device driver 358a may receive the third data transfer request from the originating computing device 302 utilizing a large receive offload (LRO) feature for a network adapter. That is, LRO is network communications acceleration hardware built into, for example, a Network Interface Card (NIC). The LRO hardware analyzes received network packets and aggregates the received packets as long as the packets are received in sequence. The LRO hardware also passes validation for packets correctness for those packets that belong to the same network connection, thereby saving network packets receive resources because the computer system receives and processes fewer packets. Device driver 358a sends the third data request to kernel level socket buffer 356a associated with opened kernel level socket connection 354a via a single TCP 360a/IP 362a stack. Kernel level socket connection 354a then sends the third data transfer request stored in kernel level socket buffer 356a to ACPM 352a. In kernel space 350a, ACPM 352a reads the aggregated message header for the third data transfer request so that each data transfer request is separated in the order in which they originated from originating application 304 so that each data transfer request is processed in the order in which they originated at destination computing device 342a. By reading the aggregated message header, ACPM 352a separates the third data transfer request in single kernel level socket buffer 356a into the first data transfer request and the second data transfer request. ACPM 352a separates the third data transfer request into the first data transfer request and the second data transfer request without modifying destination application 344a. ACPM 352a opens first application level socket connection 346a in user space 348a for the first data transfer request and second application level socket connection 346b, . . . , or 346n in user space 348a for the second data transfer request. First application level socket connection 346a then sends the first data transfer request to destination application 344a. Similarly, second application level socket connection 346b, . . . , or 346n sends the second data transfer request to destination application 344a.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4A:
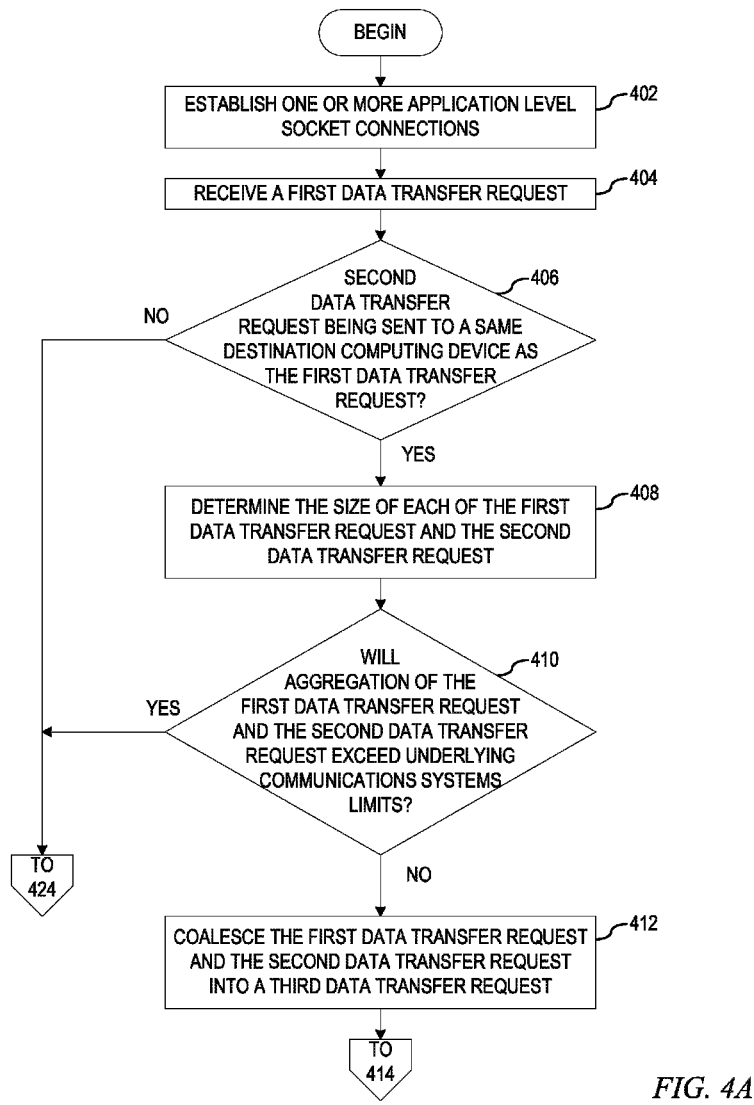
FIGS. 4A and 4B depict a flowchart of the operation performed in sending network communications in an originating computing device utilizing an Application Communication Protocol Module (ACPM) in accordance with an illustrative embodiment.
Figure 4B:
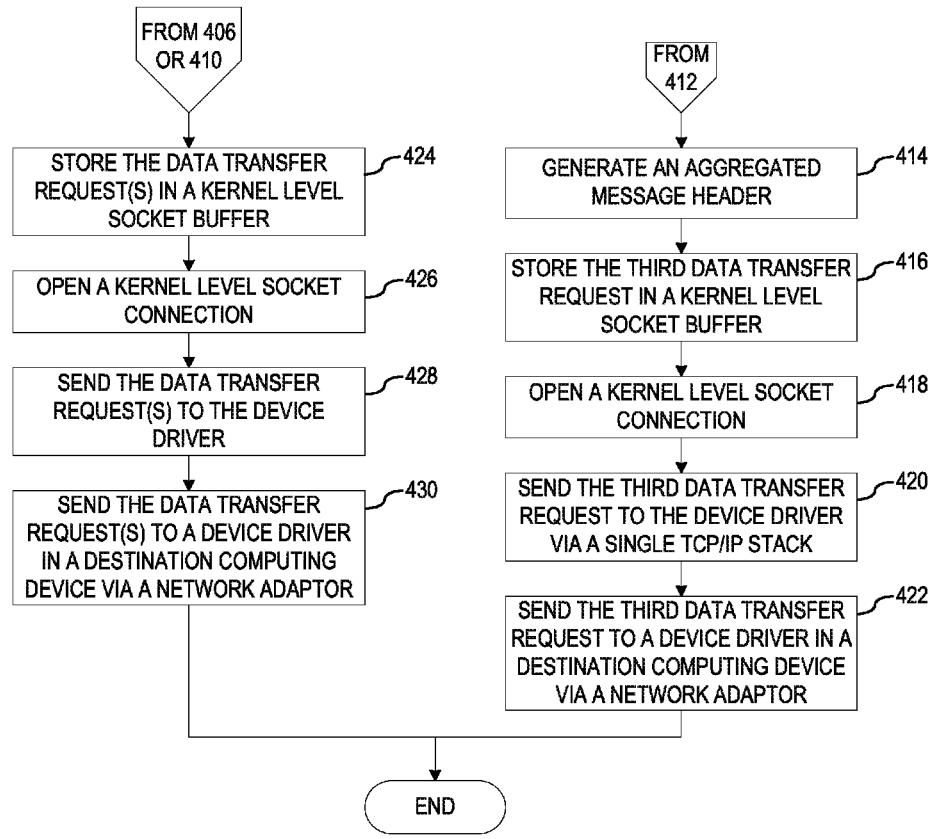

FIGS. 4A and 4B depict a flowchart of the operation performed in sending network communications in an originating computing device utilizing an Application Communication Protocol Module (ACPM) in accordance with an illustrative embodiment. As the operation begins, an originating application establishes one or more application level socket connections (step 402) in a user space when sending communications to one or more destination computing devices. In a kernel space, the ACPM receives a first data transfer request via a first application level socket connection, which is being sent to a first destination computing device (step 404). Prior to opening a kernel level socket connection, the ACPM determines whether a second data transfer request has been received via a second application level socket connection which is also being sent to the first destination computing device (step 406). If at step 406 the ACPM identifies that both the first data transfer request and the second data transfer request are being sent to the same destination computing device, the ACPM determines a size of each of the first data transfer request and the second data transfer request (step 408). Utilizing the determined sizes, the ACPM determines whether an aggregation of the first data transfer request and the second data transfer request would exceed underlying communications systems limits (step 410).

If at step 410 the ACPM determines that the aggregation of the first data transfer request and the second data transfer request would not exceed the underlying communications systems limits, the ACPM coalesces the first data transfer request and the second data transfer request into a third data transfer request (step 412). The ACPM coalesces the first data transfer request and the second data transfer request into the third data transfer request without any modification to the originating application. The ACPM further generates an aggregated message header for the third data transfer request (step 414) that allows a destination ACPM to extract the first data transfer request and the second data transfer request in the order in which they originated and are coalesced. The ACPM then stores the third data transfer request in a kernel level socket buffer (step 416) and opens a kernel level socket connection (step 418). The kernel level socket connection then sends the third data transfer request stored in the kernel level socket buffer to the device driver via a single TCP/IP stack (step 420). The device driver then sends the third data transfer request to a device driver in a destination computing device via a network adaptor (step 422), with the operation ending thereafter. The device driver sending the third data transfer request to the destination computing device may utilize a stateless offload for a network adapter, the stateless offload being, for example, a large send offload (LSO). Again, LSO is network communications acceleration hardware built into, for example, a Network Interface Card (NIC). The LSO hardware segments large messages into multiple network packets complying to frame sizes supported by Open Systems Interconnection (OSI) Session Layer 2 network. In addition, the LSO hardware inserts a protocol header, such as TCP or IP, and computes and inserts a checksum, thereby saving computer systems resources.

If at step 406 the ACPM fails to identify that both the first data transfer request and the second data transfer request are being sent to the same destination computing device or if at step 410 the ACPM determines that the aggregation of the first data transfer request and the second data transfer request would exceed the underlying communications systems limits, the ACPM stores the data transfer request(s) in a kernel level socket buffer (step 424) and opens a kernel level socket connection (step 426). The kernel level socket connection then sends the data transfer request(s) stored in the kernel level socket buffer to the device driver (step 428). The device driver then sends the data transfer request(s) to a device driver in a destination computing device via a network adaptor (step 430), with the operation ending thereafter.

Figure 5:
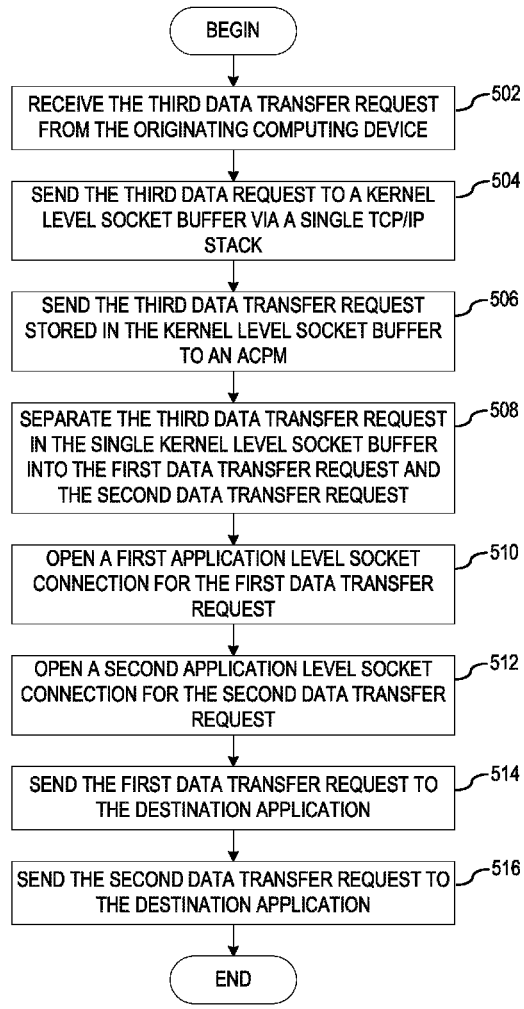
FIG. 5 depicts a flowchart of the operation performed in receiving an aggregated data transfer request in a destination computing device utilizing an Application Communication Protocol Module (ACPM) in accordance with an illustrative embodiment.

FIG. 5 depicts a flowchart of the operation performed in receiving an aggregated data transfer request in a destination computing device utilizing an Application Communication Protocol Module (ACPM) in accordance with an illustrative embodiment. As the operation begins, a device driver receives the third data transfer request from the originating computing device (step 502). The device driver may receive the third data transfer request utilizing a large receive offload (LRO) feature for a network adapter. Again, LRO is network communications acceleration hardware built into, for example, a Network Interface Card (NIC). The LRO hardware analyzes received network packets and aggregates the received packets as long as the packets are received in sequence. The LRO hardware also passes validation for packets correctness for those packets that belong to the same network connection, thereby saving network packets receive resources because the computer system receives and processes fewer packets. The device driver sends the third data request to a kernel level socket buffer associated with an opened kernel level socket connection via a single TCP/IP stack (step 504). The kernel level socket connection then sends the third data transfer request stored in the kernel level socket buffer to an ACPM (step 506). The ACPM separates the third data transfer request in the single kernel level socket buffer into the first data transfer request and the second data transfer request (step 508) utilizing an aggregated message header that identifies an order in which the first data transfer request and the second data transfer request originated from the originating computing device. The ACPM separates the third data transfer request into the first data transfer request and the second data transfer request without modifying a destination application. The ACPM opens a first application level socket connection for the first data transfer request (step 510) and a second application level socket connection for the second data transfer request (step 512). The first application level socket connection then sends the first data transfer request to the destination application (step 514) and the second application level socket connection sends the second data transfer request to the destination application (step 516), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for optimizing network communications for analytics applications to deliver maximize throughput and system resource efficiency of smart analytics systems. An application establishes one or more socket connections where both the user space and the kernel space are aware of the connection. Afterwards, in the OS kernel space, an Application Communication Protocol Module (ACPM) discovers which specific application sockets are associated with a common source or destination. The ACPM then groups those sockets that are associated with a common source or destination with a single kernel level socket, creating an aggregation group of sockets on top of a kernel socket. Since concurrent socket operations from the application will provide an aggregation of messages to a single kernel space socket buffer, the ACPM sends a single large message to the lower level stack (i.e. Layer 4, Layer 3, Layer 2), which may benefit from stateless offloads, such as LSO. Thus, the ACPM of the illustrative embodiment result in a reduced CPU costs per byte via aggregated small messages into a larger payload message, concurrency from application space to kernel space via context switches and copy into kernel, and no recompile or change to the application program interface (API).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on an originating computing device, causes the originating computing device to:

receive a first data transfer request via a first application level socket connection in the originating computing device;

prior to opening a kernel level socket connection to a destination computing device identified in the first data transfer request, determine whether a second data transfer request has been received via a second application level socket connection in the originating computing device, wherein the second data transfer request identifies a destination computing device that is the same as the destination computing device as the first data transfer request;

responsive to identifying the second data transfer request, determine a size of each of the first data transfer request and the second data transfer request and determine whether an aggregation of the first data transfer request and the second data transfer request would exceed underlying communications systems limits;

responsive to the aggregation of the first data transfer request and the second data transfer request failing to exceed the underlying communications systems limits, coalesce the first data transfer request and the second data transfer request into a third data transfer request stored in a single kernel level socket buffer of the originating computing device;
generate an aggregated message header that identifies an order in which the first data transfer request and the second data transfer request originated; and
send the third data transfer request stored in the single kernel level socket buffer of the originating computing device to the destination computing device via a single Transmission Control Protocol/Internet Protocol (TCP/IP) stack in the originating computing device to the destination computing device.

2. The computer program product of claim 1, wherein, upon receiving the third data transfer request via a single TCP/IP stack in the destination computing device, the computer readable program, when executed on the destination computing device, causes the originating computing device to:
store the third data transfer request in a single kernel level socket buffer of the destination computing device;
separate the third data transfer request in the single kernel level socket buffer of the destination computing device into the first data transfer request and the second data transfer request utilizing an aggregated message header that identifies an order in which the first data transfer request and the second data transfer request originated from the originating computing device;
open a first application level socket connection in the destination computing device for the first data transfer request;
open a second application level socket connection in the destination computing device for the second data transfer request;
send the first data transfer request to a destination application on the destination computing device via the first application level socket connection in the destination computing device; and
send the second data transfer request to the destination application on the destination computing device via the second application level socket connection in the destination computing device.

3. The computer program product of claim 2, wherein receiving the third data transfer request in the destination computing device from the originating computing device utilizes a large receive offload (LRO) feature for a network adapter in the destination computing device from the origination computing device.

4. The computer program product of claim 2, wherein the separating of the third data transfer request into the first data transfer request and the second data transfer request is performed without modifying the destination application.

5. The computer program product of claim 1, wherein sending the third data transfer request to the destination computing device via the single network connection to the destination computing device utilizes a stateless offload for a network adapter in the origination computing device to the destination computing device and wherein the stateless offload is a large send offload (LSO) feature.

6. The computer program product of claim 1, wherein the coalescing of the first data transfer request and the second data transfer request into the third data transfer request is performed without modifying an application that initiated the first data transfer request and the second data transfer request.

7. An apparatus comprising:
a first processor in an originating computing device; and
a first memory coupled to the first processor, wherein the first memory comprises first instructions which, when executed by the first processor, cause the first processor to:
receive a first data transfer request via a first application level socket connection in the originating computing device;
prior to opening a kernel level socket connection to a destination computing device identified in the first data transfer request, determine whether a second data transfer request has been received via a second application level socket connection in the originating computing device, wherein the second data transfer request identifies a destination computing device that is the same as the destination computing device as the first data transfer request;
responsive to identifying the second data transfer request, determine a size of each of the first data transfer request and the second data transfer request and determine whether an aggregation of the first data transfer request and the second data transfer request would exceed underlying communications systems limits;
responsive to the aggregation of the first data transfer request and the second data transfer request failing to exceed the underlying communications systems limits, coalesce the first data transfer request and the second data transfer request into a third data transfer request stored in a single kernel level socket buffer of the originating computing device;
generate an aggregated message header that identifies an order in which the first data transfer request and the second data transfer request originated; and
send the third data transfer request stored in the single kernel level socket buffer of the originating computing device to the destination computing device via a single Transmission Control Protocol/Internet Protocol (TCP/IP) stack in the originating computing device to the destination computing device.

8. The apparatus of claim 7, further comprising:
a second processor in an destination computing device; and
a second memory coupled to the second processor, wherein the second memory comprises second instructions which, when executed by the second processor, cause second processor to:
store the third data transfer request in a single kernel level socket buffer of the destination computing device;
separate the third data transfer request in the single kernel level socket buffer of the destination computing device into the first data transfer request and the second data transfer request utilizing an aggregated message header that identifies an order in which the first data transfer request and the second data transfer request originated from the originating computing device;
open a first application level socket connection in the destination computing device for the first data transfer request;
open a second application level socket connection in the destination computing device for the second data transfer request;
send the first data transfer request to a destination application on the destination computing device via the first application level socket connection in the destination computing device; and send the second data transfer request to the destination application on the destination computing device via the second application level socket connection in the destination computing device.

9. The apparatus of claim 8, wherein receiving the third data transfer request in the destination computing device from the originating computing device utilizes a large receive offload (LRO) feature for a network adapter in the destination computing device from the origination computing device.

10. The apparatus of claim 8, wherein the separating of the third data transfer request into the first data transfer request and the second data transfer request is performed without modifying the destination application.

11. The apparatus of claim 7, wherein sending the third data transfer request to the destination computing device via the single network connection to the destination computing device utilizes a stateless offload for a network adapter in the origination computing device to the destination computing device and wherein the stateless offload is a large send offload (LSO) feature.

12. The apparatus of claim 7, wherein the coalescing of the first data transfer request and the second data transfer request into the third data transfer request is performed without modifying an application that initiated the first data transfer request and the second data transfer request.

* * * * *